US012684070B2

(12) United States Patent (10) Patent No.: US 12,684,070 B2
Laursen et al. (45) Date of Patent: Jul. 14, 2026

(54) HIGH DENSITY DECT BASED WIRELESS AUDIO SYSTEM

(71) Applicant: RTX A/S, Nørresundby (DK)

(72) Inventors: Morten Laursen, Nørresundby (DK); Christopher Meisner, Nørresundby (DK); Jesper Hemming Sørensen, Nørresundby (DK); Mads Berre Eriksen, Nørresundby (DK)

(73) Assignee: RTX A/S, Nørresundby (DK)

( * ) Notice: Subject to any disclaimer, the term of this patent is extended or adjusted under 35 U.S.C. 154(b) by 476 days.

(21) Appl. No.: 18/250,836

(22) PCT Filed: Oct. 14, 2021

(86) PCT No.: PCT/EP2021/078474
§ 371 (c)(1),
(2) Date: Apr. 27, 2023

(87) PCT Pub. No.: WO2022/089949
PCT Pub. Date: May 5, 2022

(65) Prior Publication Data
US 2023/0396711 A1      Dec. 7, 2023

(30) Foreign Application Priority Data
Oct. 29, 2020     (DK) ........................... PA 2020 70714

(51) Int. Cl.
*H04M 3/00*          (2024.01)
*H04M 3/56*          (2006.01)
*H04M 5/00*          (2006.01)

(52) U.S. Cl.
CPC ........ *H04M 3/561* (2013.01); *H04M 2250/08* (2013.01)

(58) Field of Classification Search
CPC ....... H04M 2250/08; H04M 2207/206; H04M 1/72502; H04M 7/006; H04M 1/725;
(Continued)

(56) References Cited

U.S. PATENT DOCUMENTS

2002/0068552 A1     6/2002   Siemens
2011/0150249 A1*    6/2011   Klemmensen ....... H04R 25/554
                                                          381/312
(Continued)

FOREIGN PATENT DOCUMENTS

JP          2019149653 A      9/2019
JP          2020096237 A      6/2020

OTHER PUBLICATIONS

Notice of Reasons for Refusal for Japanese Patent Application No. 2023-525971, dated Apr. 4, 2025, 10 pages. (English Translation Provided).
(Continued)

*Primary Examiner* — Kharye Pope
(74) *Attorney, Agent, or Firm* — BakerHostetler

(57) ABSTRACT

A wireless communication method and protocol for wireless RF transmission of audio data from a plurality of wireless RF devices (portable parts PP) to a wireless RF receiver device (fixed part FP) using a full slot DECT protocol. The FP broadcasts in each frame, a multiplex of control information to the plurality of PPs. The PPs receive the multiplex of control information, and extract control information intended for each individual PP from the multiplex of control information. Preferably, the PPs are synchronized to transmit audio data in respective time slots covering both time slots in first and second half of the frame. This allows a high number of PPs to be connected to one FP still at a high audio quality with low latency, since both the normal uplink and downlink parts of the DECT frame are used for audio data transmission. This allows the method to be used for a
(Continued)

conference call system of a high number of wireless microphone devices, or a live performance wireless microphone and/or musical instrument sound system or the like.

18 Claims, 3 Drawing Sheets

(58) Field of Classification Search
CPC ..... H04M 1/733; H04W 84/14; H04W 88/08; H04W 72/0446; H04B 7/2643; H04B 7/2656; H04R 2420/07; H04R 1/406; H04R 29/004
See application file for complete search history.

(56) References Cited

U.S. PATENT DOCUMENTS

| | | | |
|---|---|---|---|
| 2012/0237053 A1 * | 9/2012 | Alam | H04R 5/04 |
| | | | 381/80 |
| 2013/0324139 A1 * | 12/2013 | Kupershmidt | H04W 68/025 |
| | | | 455/450 |
| 2014/0023017 A1 | 1/2014 | Karls et al. | |
| 2015/0365168 A1 * | 12/2015 | Arimura | H04W 56/0015 |
| | | | 398/52 |
| 2017/0164294 A1 * | 6/2017 | Dickinson | H04W 76/10 |
| 2019/0200149 A1 * | 6/2019 | Abe | H04R 29/004 |

OTHER PUBLICATIONS

International Patent Application No. PCT/EP2021/078474; Int'l Search Report and the Written Opinion; dated Jan. 20, 2022; 14 pages.
Digital Enhanced Cordless Telecommunications (DECT); Common Interface (CI); Part 3: Medium Access Control (MAC) layer; ETSI EN 300 175-3 V2; Feb. 2007; 252 pages.
Digital Enhanced Cordless Telecommunications (DECT); Dect Packet Radio service (DPRS); ETSI EN 301 649 V1.4.5; Mar. 2009; 299 pages.

* cited by examiner

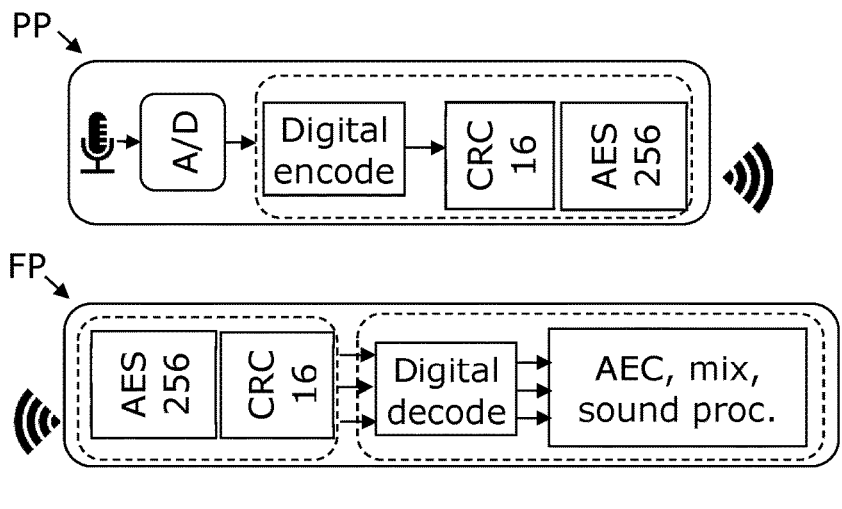
FIG. 5
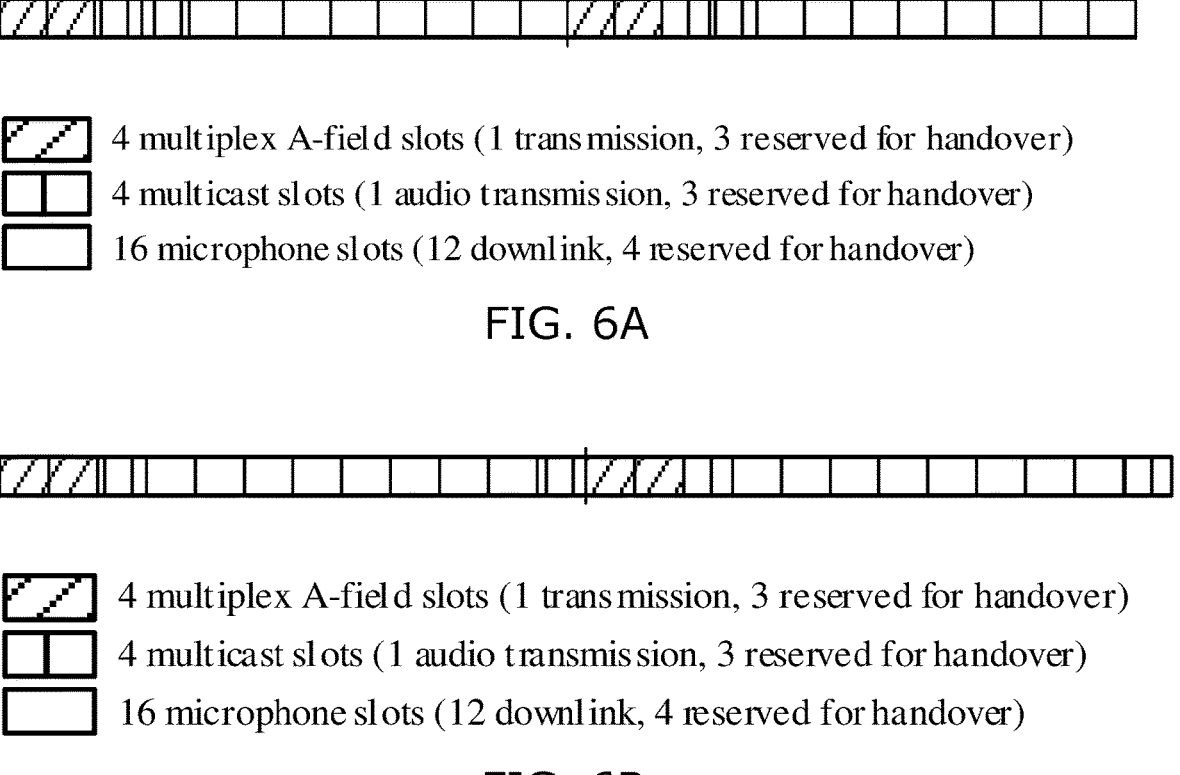
⬚ 4 multiplex A-field slots (1 transmission, 3 reserved for handover)
⬚ 4 multicast slots (1 audio transmission, 3 reserved for handover)
⬚ 16 microphone slots (12 downlink, 4 reserved for handover)
FIG. 6A
⬚ 4 multiplex A-field slots (1 transmission, 3 reserved for handover)
⬚ 4 multicast slots (1 audio transmission, 3 reserved for handover)
⬚ 16 microphone slots (12 downlink, 4 reserved for handover)
FIG. 6B

HIGH DENSITY DECT BASED WIRELESS AUDIO SYSTEM

CROSS-REFERENCE TO RELATED APPLICATIONS

This application is the National Stage of International Patent Application No. PCT/EP2021/078474 (filed Oct. 14, 2021); which claims priority to and the benefit of DK Application No. PA 2020 70714 (filed Oct. 29, 2020). The entireties of all foregoing applications are incorporated herein by reference in their entireties for any and all purposes.

FIELD OF THE INVENTION

The present invention relates to the field of wireless transmission of audio, such as one-way wireless audio streaming. Specifically, the invention proposes a high density DECT based wireless system for communication of multiple audio streams, such as utilizing DECT full slots.

BACKGROUND OF THE INVENTION

For applications such as wireless microphones or music instrument transmitter for live performance or for wireless microphones in a teleconference system, a simple high quality multi channel wireless audio transmission with a low latency (delay) is important.

Traditional wireless DECT technologies are based for star network topologies and is typically suitable for two-way communication between a plurality of portable parts (PP) and a base station (fixed part, FP). The FP normally controls all the communication to the PPs and usually provides slot and frame timing information in a master-slave configuration. The PPs synchronize precisely to the FP timing.

However, in case of simultaneous streaming of high quality audio from PPs to an FP, such DECT based protocol will limit the possible number of simultaneous PPs and/or the available audio quality and/or the resulting latency.

SUMMARY OF THE INVENTION

Thus, according to the above description, it is an object of the present invention to provide a wireless RF communication method for high quality audio streaming with low latency from a plurality of simultaneous RF transmitting devices.

In a first aspect, the invention provides a method for wireless RF one-way communication of audio data, wherein the method comprising providing a plurality of portable part devices each being configured to transmit audio data represented in frames each containing a plurality of time slots in a wireless RF signal according to a DECT compatible protocol, providing a fixed part device configured to receive said wireless RF signals from the plurality of portable devices and to regenerate the respective audio data represented therein, broadcasting in each DECT compatible frame, by the fixed part device, a multiplex of control information to the plurality of portable part devices, receiving the multiplex of control information, by each of the portable part devices, and extracting control information intended for each individual portable part device from the multiplex of control information.

Such method provides a high capacity wireless RF system allowing a high number of portable part devices, e.g. microphones of a tele conference system, to be used with one fixed part device or base station with the use of a DECT protocol. This is possible by means of a common broadcasting of control information to all portable part devices from the fixed part device. This allows both uplink and downlink parts of the DECT frames to be used for audio data transmission from the portable part devices to the fixed part device, thereby increasing audio transmission capacity. This can be used to increase the number of portable part devices connected to one fixed part (base station), and/or to ensure a higher audio quality for the same number of fixed part devices. Still, the method allows that the multi channel audio transmission has a low latency, which is an important parameter for live audio streaming.

To support audio transmission from a very high number of portable fixed part devices, a system comprising a plurality of separate fixed part receiver devices (base stations) operating in synchronization can be used. In this way e.g. up to 80-100 or even more audio channels can be obtained.

The DECT protocol exists in a number of area or country specific variants. However the invention is compatible with and can thus be exploited in a large part of these specific DECT variants.

The below phrases will be used and are therefore explained:

Time Division Multiple Access (TDMA).

Digital Enhanced Cordless Telecommunications (DECT).

Cyclic Redundancy Check (CRC) for error check.

A single radio event e.g. transmit or receive is denoted a slot or time slot.

A repeated sequence of slots, including slot(s) for interference scanning (TDMA frame) is denoted a frame.

In the following preferred embodiments and features will be described.

The DECT compatible frames are preferably full slot DECT frames, thereby allowing a high number of portable parts with a high audio quality. Alternatively, the DECT frames may be long slot frames, double slot frames, or half slot frames.

Preferably, one or more time slots in each frame is dedicated to broadcasting said multiplex of control information from the fixed part device. Especially, two time slots in each half frame may be dedicated to broadcasting said multiplex of control information from the fixed part device. Especially, the first two time slots in each half frame may be dedicated to broadcasting said multiplex control information. However, it is to be understood that preferably any one or two time slots in each frame may be dedicated to broadcasting said multiplex of control information.

The multiplex control information is preferably contained as multiplexed A-fields in a B-field of one or more slots, such as one or more full slots. Specifically, one slot, e.g. a full slot, dedicated for said multiplex control information may comprise an A-field and a B-field, wherein the B-field comprises a header part, an error checking part (e.g. CRC) and a part containing said multiplex control information.

Preferably, at least 50%, e.g. 50-80%, of time slots in both first and second half parts of each frame are dedicated for transmission of audio data from the plurality of portable part devices. In this way, a high amount of the available transmission capacity is utilized for audio data, thereby allowing multiple PPs connected to one FP still with a high audio quality, e.g. 48 kHz sample frequency and 16-32 bit amplitude representation.

The plurality of portable part devices are preferably synchronized to transmit audio data in respective time slots of each frame. Specifically, more than 8 portable part devices, e.g. 9-16 portable part devices, may be synchronized to transmit audio data in respective time slots of each frame, e.g. each transmitting audio data in one time slot per half frame.

The fixed part device is preferably arranged to receive a total of at least 64 kbps audio data.

It is to be understood that each portable part device can be a stand-alone device including RF receiver and transmitter circuits configured to operate according to the above-defined method. The portable part device can include an audio data source, e.g. a microphone with an associated analog to digital converter, or the portable part device can be a dedicated stand-alone audio transmitter device with an analog or digital audio interface to receive an audio signal, e.g. a wireless RF transmitter for transmission of sound from a musical instrument or the like.

Since the method is suitable for high quality audio transmission, the portable part device can be e.g. a stage microphone, since in addition a low latency is possible. Another example for the wireless RF device is a teleconference microphone.

In general the method is advantageous for wireless audio transmission system where the method offers a trade between 1) number of portable part devices connected to one fixed part device (base station) and 2) audio quality (i.e. bits per second rate) given a wireless RF transmission channel with limited capacity.

Especially, the audio data packets may represent a digital audio signal sampled at a sampling frequency of 20 kHz or more, such as 32 kHz, 48 kHz or more. The digital audio signal may be an encoded digital audio signal, such as encoded according to an ADPCM algorithm or the like.

In preferred embodiments, the method is implemented as a DECT compatible protocol which is compatible with requirements of one or more regional or country DECT compatible variants.

In some embodiments, the method comprises
broadcasting in each DECT compatible frame, by the fixed part device, at least one time slot, such as 2-4 time slots, of audio data to the plurality of portable part devices,
receiving the at least one time slot of audio data, by each of the portable part devices, and
extracting, by each of the plurality of portable part devices, an audio signal in response to the received at least one time slot of audio data.

In such embodiments, another audio feature is added to the one-way audio transmission from the plurality of portable part devices to the fixed part device, namely the possibility to broadcast or multicast one audio signal to all of the plurality of portable part devices. Especially, the fixed part device, or another device, may generate an audio signal in response to the plurality of audio signals received from the plurality of portable part devices, e.g. a mix of said plurality of audio signals, which can them be sent as feedback to the plurality of portable part devices. Thus, the fixed part device is not capable of a duplex audio communication with the plurality of portable part devices, but merely to transmit or broadcast one common audio signal to all of the plurality of portable part devices. Especially, 2-4 time slots in each DECT frame may be dedicated to broadcasting said audio data from the fixed part device. Especially, two time slots in each half frame are dedicated to broadcasting said audio data from the fixed part device.

Especially, two consecutive time slots in each half frame are dedicated to broadcasting said audio data from the fixed part device. Especially, at least 4 time slots in each DECT frame are dedicated to said multiplex of control information, and wherein at least 4 time slots in each DECT frame are dedicated to said audio data to be broadcast by the fixed part device. Especially, at least 16 time slots in each DECT frame are dedicated to said audio data to be transmitted from the plurality of portable part devices. In a specific embodiment, each DECT frame has: 16 time slots dedicated to audio data from the plurality of portable part devices, 4 time slots dedicated to the multiplex of control information, and 4 time slots dedicated to audio data to be broadcast by the fixed part device.

In a second aspect, the invention provides a wireless RF device comprising at least one RF transmitter and RF receiver circuit connected to at least one RF antenna, the wireless RF device being arranged to operate as the portable part device according to the method of the first aspect.

The wireless RF device may be arranged to receive audio data represented in at least one time slot in each DECT frame. Especially, the wireless RF device may comprise an acoustic transducer, such as a loudspeaker, arranged to generate an acoustic signal in accordance with said received audio data.

In one embodiment, the wireless RF device comprises a microphone arranged to capture sound and to generate audio data accordingly, e.g. to serve as a high quality stage microphone or a tele conference microphone, or the like. The FP alternatively or additionally include an analog or digital audio interface to receive an audio signal, e.g. a wireless RF transmitter for transmission of sound from a musical instrument or the like. Especially, the wireless RF device is a headset or a device comprising a combination of a microphone and an acoustic transducer arranged to generate an acoustic signal in response to a received audio signal. Especially the loudspeaker may be in the form of an earphone, a headphone or an in-ear device.

In a third aspect, the invention provides an FP configured to operate as the fixed part device according to the method of the first aspect.

The FP or fixed part device may be a stand-alone device with a multi channel audio output interface with multiple analog and/or digital audio outputs arranged for output of audio signals corresponding to the received audio data from the plurality of wireless RF devices. Alternatively, the FP may form part of another device, e.g. an audio device for live performance or studio, such as an audio mixing console. Especially, the fixed part device may further be arranged to broadcast an audio signal represented as audio data represented in at least one time slot in each DECT frame.

In a fourth aspect, the invention provides a system comprising a plurality of PPs according to the second aspect, and a FP according to the third aspect.

The system may especially comprise an audio reproduction system comprising at least one loudspeaker arranged to generate an acoustic output in response to audio data transmitted from at least one of the plurality of PPs and regenerated by the FPs.

To allow a high number of audio channels, the system may comprise a plurality of FPs according to the third aspect, wherein each of the FPs is arranged to receive audio data from a plurality of PPs according to the second aspect, and wherein the plurality of FPs are configured for synchronized cooperation.

Especially, the system may be one of: a tele conference system, a wireless live performance audio system, a board room conference system, a class room audio system and a parliament or conference audio system.

Especially, the system may comprise at least 8, such as 8-16, portable devices configured for wireless RF connection to the fixed part by using audio data transmission in respective time slots of each DECT frame.

In a fifth aspect, the invention provides use of the system according to the fourth aspect for one or more of: a tele conference system, a wireless live performance audio system, a board room conference system, a class room audio system and a parliament or conference audio system.

It is to be understood that the required RF transmitter and RF receiver circuits, antenna and programming required to implement the method according to the first aspect will be known by the skilled person based on the present description of the inventive method.

In a sixth aspect, the invention provides a program code comprising first and second code parts arranged to cause the method according to the first aspect to be performed, when the first code part is executed on a processor in a plurality of portable part devices (e.g. according to the second aspect), and when the second code part is executed on a processor in a fixed part device (e.g. according to the third aspect).

Especially, the first and second code parts may be stored in memory in respective chips of respective first and second devices, or on one or more tangible storage media, or available on the internet in a version for downloading. The first and second code parts may be in a general code format or in a processor dedicated format.

It is appreciated that the same advantages and embodiments described for the first aspect apply as well the further mentioned aspects. Further, it is appreciated that the described embodiments can be intermixed in any way between all the mentioned aspects.

BRIEF DESCRIPTION OF THE FIGURES

The invention will now be described in more detail with regard to the accompanying figures of which FIG. 5 illustrates an example of components of a wireless RF microphone device and a corresponding wireless RF receiver device, and FIGS. 6A and 6B illustrate examples of DECT frame configuration for embodiments with multicast audio to the plurality of wireless RF devices.

The figures illustrate specific ways of implementing the present invention and are not to be construed as being limiting to other possible embodiments falling within the scope of the attached claim set.

DETAILED DESCRIPTION OF THE INVENTION

Figure 1:
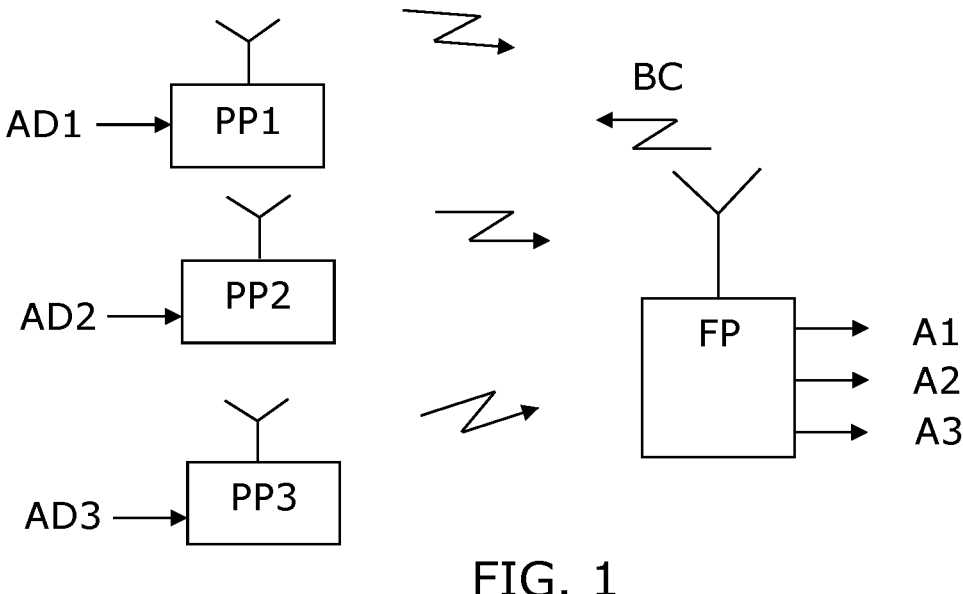
FIG. 1 illustrates a simple block diagram of a system of three portable part devices in one-way audio transmission to a fixed part device which broadcasts control information to the wireless RF devices according to a DECT protocol.

FIG. 1 shows a simple illustration of three wireless RF devices, portable parts, PP1, PP2, PP3, each being arranged to communicate respective audio signals AD1, AD2, AD3 represented in digital data packets transmitted in an RF representation via a DECT based protocol to a wireless RF receiver device, fixed part or base station. The fixed part device (FP) then regenerates the received audio data into respective audio signals A1, A2, A3. According to preferred embodiments of the present invention, the portable part devices PP1, PP2, PP3 are synchronized by means of control information transmitted from the fixed part device (FP) as broadcast common information BC transmitted to all of the portable parts devices PP1, PP2, PP3 in time slots one or more time slots in each DECT frame. Thus, since all control information is transmitted in the broadcast time slot BC, only a limited part of a frame is occupied with control information, e.g. for synchronization, thus leaving space for transmission of audio data from the portable part devices PP1, PP2, PP3 in both uplink and downlink parts of each frame. Thus, a high number of portable part devices PP1, PP2, PP3 transmitting high quality, i.e. high rate, audio data can be connected to one single fixed part device FP. Still with a low latency on the transmitted audio, and with a high reliability due to the synchronization, preferably where the portable part devices PP1, PP2, PP3 are controlled and synchronized to transmit one audio data packet in predetermined respective time slots in each frame consecutively.

Figure 2:
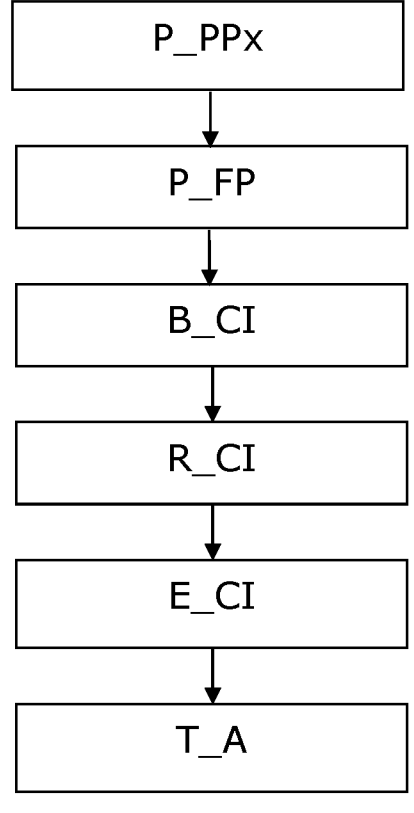
FIG. 2 illustrates steps of a method embodiment.

FIG. 2 illustrates steps of a wireless RF communication method embodiment for RF communication of a plurality of digital audio data according to a DECT protocol. First, providing P_PPx a plurality of portable part devices each being configured to transmit audio data represented in frames each containing a plurality of time slots in a wireless RF signal according to a DECT compatible protocol, and providing P_FP a fixed part device configured to receive said wireless RF signals from the plurality of portable part devices and to regenerate the respective audio data represented therein. The method comprises broadcasting B_CI in each DECT frame, by the fixed part device, a multiplex of control information to the plurality of portable part devices, e.g. containing information regarding synchronization information to allow the portable part devices to transmit their audio data in different predetermined time slots of each frame. Next, receiving R_CI the multiplex of control information, by each of the portable part devices, and further extracting E_CI control information intended for each individual portable part device from the multiplex of control information, thus allowing each portable part device to determine in which time slots to transmit its audio data, thereby avoiding collision. Finally, transmitting T_A audio data by the portable part devices in the respective time slots in each frame. Preferably, the fixed part device receives a stream of frames and thus performs the step of regenerating audio signals according to the transmitted audio data transmitted from the respective portable part devices.

Figure 3:
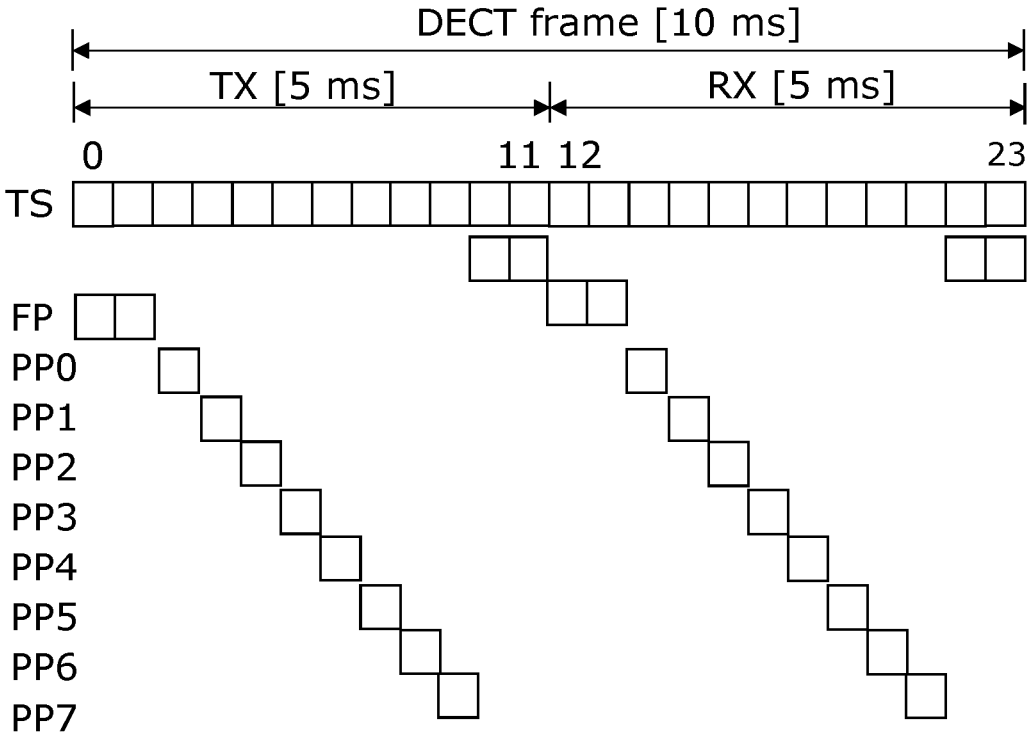
FIG. 3 illustrates an example of a DECT frame with control information from the fixed part and audio data from the portable parts in each half frame.

FIG. 3 illustrates an example of implementation of the invention, where it is seen that both time slots TS in the TX and RX parts of each DECT frame are utilized for audio data transmission from PPs, here 8 denoted PP0-PP7, to the FP. Using DECT full slots, and with B-field modulation being π/4-DQPSK modulation, 1280 bits are available for payload data. To protect the audio decoder a 16 bit CRC is used (one for each transmission), resulting in 1248 bits/frame for the encoded audio (124.8 kbps).

In FIG. 3 each 10 ms DECT frame is divided into 24 time slots TS, and the first two slots in each half frame, i.e. a total of 4 time slots, numbers 0, 1, 12 and 13, are dedicated to the fixed part FP broadcasting control information which is received by all PPs. As seen, each PP has two dedicated time slots, one in each half frame, for transmission of audio data. E.g. PP0 transmits data in time slot TS numbers 2 and 14.

Thus, the proposed DECT frame design provides a double simplex connection, since instead of having a return channel in the second half of the DECT frame, 5 ms of audio is transmitted in each half frame. Using a DECT full slot double simplex bearer connection, a 124.8 kbps audio bandwidth from PP to FP can be obtained and supports up to 8 PPs to be connected to one FP. The theoretical maximum density of microphones is 104 (by using 13 synchronized FPs), but a density of up to 80 (10 synchronized FPs) is more preferred (This example holds for products operating in the European Union).

Figure 4:
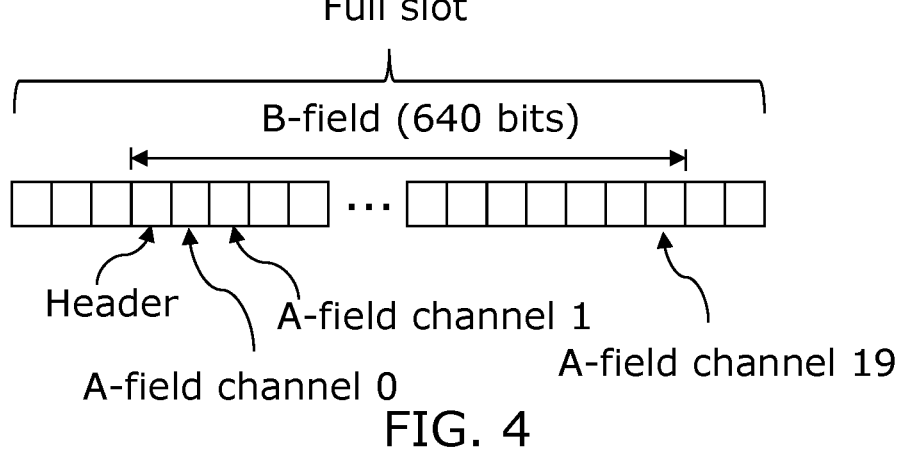
FIG. 4 illustrates an example of a possible use of a full slot for broadcasting a multiplex of control information to a plurality of wireless RF devices.

FIG. 4 illustrates an example of implementation of one full slot which the FP broadcasts to all PPs. In a specific implementation, the full slot contains a B-field of 640 bits, but including a header and a multiplex of A-field data channels allocated to each PP. In case of an intracell handover a PP will during the handover occupy two A-field data channels on the broadcast.

FIG. 5 illustrates elements of a specific embodiment of the portable part device (PP) in the form of a wireless microphone, and the corresponding fixed part device (FP). The PP has a microphone connected to an analog-to-digital converter A/D which receives the analog audio signal from the microphone and converts it into a digital format, e.g. operating at a sample frequency of 48 kHz, and applies the digital signal to a digital encoder which is followed by a CRC calculation and finally applies the resulting data for an encryption (AES256), and finally the resulting signal data is RF transmitted in the predetermined time slots of the DECT frame.

The fixed part device FP receives the audio data packets from the PPs, and performs the reverse processing, including decoding audio data from each of the PPs, and the resulting audio signals are then applied to further processing, which may include Acoustic Echo Cancellation (AEC), a mixing and further sound processing before the final audio output is generated—e.g. as a mix of the plurality of audio signals regenerated from the PPs down to one or two separate audio channels.

By using the DECT frame configuration shown in FIG. 3 in the device embodiments shown in FIG. 5, the total latency that can be obtained is about 24 ms, and this latency is constant for all PPs.

FIGS. 6A and 6B show two different DECT frame configurations for embodiments with an audio multicast channel for broadcasting of an audio signal to all of the plurality of portable part devices. In both of these configurations, one DECT frame has 24 time slots, and it is split into two identical parts each with 12 time slots, and wherein:

16 time slots are dedicated to audio data from the plurality of portable part devices, 4 time slots are dedicated to multiplex control information to the plurality of portable devices, and 4 time slots are dedicated to broadcast or multicast audio data from the fixed part device to the plurality of portable part devices. In FIG. 6A, two consecutive time slots are dedicated to the broadcast or multicast audio data in each half frame. In FIG. 6B, the two time slots dedicated to the broadcast or multicast audio data in each half frame are separated by the 8 time slots dedicated to audio data from the plurality of portable part devices.

To sum up, the invention provides a wireless communication method and protocol for wireless RF transmission of audio data from a plurality of wireless RF devices (portable parts PP) to a wireless RF receiver device (fixed part FP) using a full slot DECT protocol. The FP broadcasts in each frame, a multiplex of control information to the plurality of PPs. The PPs receive the multiplex of control information, and extract control information intended for each individual PP from the multiplex of control information. The PPs are synchronized to transmit audio data in respective time slots covering both time slots in first and second half of the frame. This allows a high number of PPs to be connected to one FP still at a high audio quality with low latency, since both the normal uplink and downlink parts of the DECT frame are used for audio data transmission. This allows the method to be used for a conference call system of a high number of wireless microphone devices, or a live performance wireless microphone and/or musical instrument sound system or the like.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for wireless Radio Frequency (RF) one-way communication of audio data, comprising:

providing a plurality of portable part devices each being configured to transmit audio data represented in frames each containing a plurality of time slots in a wireless RF signal according to a Digital Enhanced Cordless Telecommunications (DECT)-compatible protocol, providing a fixed part device configured to receive said wireless RF signals from the plurality of portable part devices and to regenerate the respective audio data represented therein, broadcasting in each DECT compatible frame, by the fixed part device, a multiplex of control information to the plurality of portable part devices, wherein the control information contains information to allow the portable part devices to transmit their audio data in different predetermined time slots of each frame, receiving the multiplex of control information, by each of the portable part devices, and extracting control information intended for each individual portable part device from the multiplex of control information.

2. The method according to claim 1, wherein the DECT compatible frames are full slot frames.

3. The method according to claim 1, wherein the DECT compatible frames are selected from: long slot frames, double slot frames, and half slot frames.

4. The method according to claim 1, wherein one or more time slots in each frame is dedicated to broadcasting said multiplex of control information from the fixed part device.

5. The method according to claim 4, wherein two time slots in each half frame are dedicated to broadcasting said multiplex of control information from the fixed part device.

6. The method according to claim 5, wherein each half frame comprises a plurality of time slots, the first two of the plurality of time slots being dedicated to broadcasting said multiplex control information.

7. The method according to claim 1, wherein at least 50% of time slots in both first and second half parts of each frame are dedicated for transmission of audio data from the plurality of portable part devices.

8. The method according to claim 1, wherein the plurality of portable part devices are synchronized to transmit audio data in respective time slots of each frame.

9. The method according to claim 8, wherein from 9 to 16 portable part devices are synchronized to transmit audio data in respective time slots of each frame.

10. The method according to claim 1, wherein the fixed part device is arranged to receive a total of at least 64 kbps audio data.

11. The method according to claim 1, further comprising
  broadcasting in each DECT compatible frame, by the
    fixed part device, at least one time slot of audio data to
    the plurality of portable part devices,
  receiving the at least one time slot of audio data, by each
    of the portable part devices, and
  extracting, by each of the plurality of portable part
    devices, an audio signal in response to the received at
    least one time slot of audio data.

12. The method according to claim 11, wherein 2-4 time slots in each DECT frame are dedicated to broadcasting said audio data from the fixed part device.

13. The method according to claim 12, wherein two consecutive time slots in each half frame are dedicated to broadcasting said audio data from the fixed part device.

14. The method according to claim 11, wherein at least 4 time slots in each DECT frame are dedicated to said multiplex of control information, and wherein at least 4 time slots in each DECT frame are dedicated to said audio data to be broadcast by the fixed part device.

15. The method according to claim 11, wherein at least 16 time slots in each DECT frame are dedicated to said audio data to be transmitted from the plurality of portable part devices.

16. A wireless RF device comprising at least one RF transmitter and an RF receiver circuit connected to at least one RF antenna, the wireless RF device being arranged to operate according to a portable part device according to claim 1, the wireless RF device optionally
  (i) comprising a microphone arranged to capture sound
    and to generate audio data accordingly, the wireless RF
    device,
  (ii) being arranged to receive audio data represented in at
    least one time slot in each DECT frame, the wireless
    device further optionally comprising an acoustic trans-
    ducer, such as a loudspeaker, arranged to generate an
    acoustic signal in accordance with said received audio
    data.

17. A wireless RF receiver device configured to operate according to a fixed part device according to claim 1, the wireless RF receiver device being configured to broadcast an audio signal represented as audio data represented in at least one time slot in each DECT frame, and the wireless RF receiver device optionally being configured to broadcast an audio signal represented as audio data represented in at least one time slot in each DECT frame.

18. A system, comprising:
  a plurality of wireless RF devices, a wireless RF device
    comprising at least one RF transmitter and an RF
    receiver circuit connected to at least one RF antenna,
    and a wireless RF device being configured to transmit
    audio data represented in frames each containing a
    plurality of time slots in a wireless RF signal according
    to a DECT compatible protocol, and
  a wireless RF receiver device configured to receive said
    wireless RF signals from the plurality of wireless RF
    devices and to regenerate the respective audio data
    represented therein,
  the system optionally comprising an audio reproduction
    system comprising at least one loudspeaker arranged to
    generate an acoustic output in response to audio data
    transmitted from at least one of the plurality of wireless
    RF devices and regenerated by the wireless RF receiver
    device.

* * * * *